United States Patent
Watson et al.

(10) Patent No.: US 9,147,436 B2
(45) Date of Patent: Sep. 29, 2015

(54) SLIM FORM FACTOR DISK DRIVE COMPRISING DISK DRIVE ENCLOSURE HAVING AN INSULAR RAISED REGION

(75) Inventors: Scott E. Watson, San Jose, CA (US); Yau-Shing Lee, Sunnyvale, CA (US); Thomas J. Hitchner, San Martin, CA (US); David K. Myers, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 100 days.

(21) Appl. No.: 13/455,538

(22) Filed: Apr. 25, 2012

(65) Prior Publication Data

US 2013/0290988 A1   Oct. 31, 2013

(51) Int. Cl.
G11B 25/04   (2006.01)
G11B 33/02   (2006.01)

(52) U.S. Cl.
CPC .............. *G11B 33/02* (2013.01); *G11B 25/043* (2013.01)

(58) Field of Classification Search
USPC .......... 360/99.15, 99.16, 99.17, 99.18, 99.19, 360/99.13, 99.14, 99.24, 99.25; 361/679.33
See application file for complete search history.

(56) References Cited

U.S. PATENT DOCUMENTS

| | | | |
|---|---|---|---|
| 4,546,464 A * | 10/1985 | Inoue et al. ................ 369/280 |
| 4,974,103 A * | 11/1990 | Iftikar et al. ............... 360/99.13 |
| 5,046,683 A * | 9/1991 | Carroll ........................ 242/345.2 |
| 5,140,478 A * | 8/1992 | Yoshida ....................... 360/99.16 |
| 5,235,482 A | 8/1993 | Schmitz |
| 5,264,975 A * | 11/1993 | Bajorek et al. ............. 360/99.19 |
| 5,282,099 A * | 1/1994 | Kawagoe et al. .......... 360/99.19 |
| 5,396,384 A * | 3/1995 | Caldeira et al. ............ 360/98.01 |
| 5,488,523 A * | 1/1996 | Seaver et al. ............... 360/99.12 |
| 5,596,461 A * | 1/1997 | Stefansky .................... 360/99.16 |
| 5,677,813 A * | 10/1997 | Yoshida et al. ............. 360/99.18 |
| 5,748,449 A * | 5/1998 | Tahmassebpur ............... 361/753 |
| 5,768,049 A * | 6/1998 | Morehouse et al. ........ 360/97.21 |
| 5,880,904 A * | 3/1999 | Mizoshita et al. .......... 360/97.16 |
| 5,918,068 A * | 6/1999 | Shafe' ........................... 710/11 |
| 6,046,889 A | 4/2000 | Berding et al. |
| 6,052,890 A | 4/2000 | Malagrino, Jr. et al. |
| 6,061,206 A | 5/2000 | Foisy et al. |
| 6,064,567 A * | 5/2000 | Cheng ......................... 361/679.31 |
| 6,101,876 A | 8/2000 | Brooks et al. |
| 6,147,831 A | 11/2000 | Kennedy et al. |
| 6,151,189 A | 11/2000 | Brooks |
| 6,151,197 A | 11/2000 | Larson et al. |
| 6,185,067 B1 | 2/2001 | Chamberlain |
| 6,185,074 B1 | 2/2001 | Wang et al. |
| 6,208,486 B1 | 3/2001 | Gustafson et al. |
| 6,215,616 B1 | 4/2001 | Phan et al. |
| 6,219,909 B1 * | 4/2001 | Ogawa et al. ..................... 29/840 |
| 6,272,694 B1 | 8/2001 | Knoth et al. |
| 6,288,866 B1 | 9/2001 | Butler et al. |

(Continued)

*Primary Examiner* — Brian Miller

(57) ABSTRACT

A disk drive comprises a drive enclosure defining a generally rectangular form factor; an electromechanical assembly contained within the drive enclosure, and a printed circuit board assembly (PCBA) at least partially contained within the drive enclosure. The drive enclosure possesses at least one of the following characteristics: the drive enclosure defines chamfers on at least one of four corners of the generally rectangular form factor; and the drive enclosure defines a first surface and a second surface that defines an interior second surface portion and a peripheral second surface portion and wherein the interior second surface portion is further away from the first surface than is the peripheral second surface portion.

20 Claims, 5 Drawing Sheets

(56) References Cited

U.S. PATENT DOCUMENTS

| | | | |
|---|---|---|---|
| 6,292,333 B1 | 9/2001 | Blumentritt et al. | |
| 6,320,723 B1 * | 11/2001 | Bernett | 360/97.13 |
| 6,344,950 B1 | 2/2002 | Watson et al. | |
| 6,349,464 B1 | 2/2002 | Codilian et al. | |
| 6,385,006 B1 * | 5/2002 | Kaczeus et al. | 360/99.13 |
| 6,388,873 B1 | 5/2002 | Brooks et al. | |
| 6,417,979 B1 | 7/2002 | Patton, III et al. | |
| 6,417,985 B1 * | 7/2002 | Noda | 360/97.19 |
| 6,421,208 B1 | 7/2002 | Oveyssi | |
| 6,441,998 B1 | 8/2002 | Abrahamson | |
| 6,454,572 B1 * | 9/2002 | Konetski et al. | 439/66 |
| 6,462,914 B1 | 10/2002 | Oveyssi et al. | |
| 6,466,398 B1 | 10/2002 | Butler et al. | |
| 6,469,871 B1 | 10/2002 | Wang | |
| 6,502,300 B1 | 1/2003 | Casey et al. | |
| 6,519,110 B2 * | 2/2003 | Dague et al. | 360/99.17 |
| 6,519,116 B1 | 2/2003 | Lin et al. | |
| 6,529,345 B1 | 3/2003 | Butler et al. | |
| 6,529,351 B1 | 3/2003 | Oveyssi et al. | |
| 6,535,358 B1 | 3/2003 | Hauert et al. | |
| 6,545,382 B1 | 4/2003 | Bennett | |
| 6,549,381 B1 | 4/2003 | Watson | |
| 6,560,065 B1 | 5/2003 | Yang et al. | |
| 6,571,460 B1 | 6/2003 | Casey et al. | |
| 6,574,073 B1 | 6/2003 | Hauert et al. | |
| 6,580,574 B1 | 6/2003 | Codilian | |
| 6,594,111 B1 | 7/2003 | Oveyssi et al. | |
| 6,597,531 B2 * | 7/2003 | Noda | 360/99.18 |
| 6,603,620 B1 | 8/2003 | Berding | |
| 6,618,222 B1 | 9/2003 | Watkins et al. | |
| 6,624,966 B1 | 9/2003 | Ou-Yang et al. | |
| 6,624,980 B1 | 9/2003 | Watson et al. | |
| 6,624,983 B1 | 9/2003 | Berding | |
| 6,628,473 B1 | 9/2003 | Codilian et al. | |
| 6,654,200 B1 | 11/2003 | Alexander et al. | |
| 6,657,811 B1 | 12/2003 | Codilian | |
| 6,661,597 B1 | 12/2003 | Codilian et al. | |
| 6,661,603 B1 | 12/2003 | Watkins et al. | |
| 6,661,604 B2 * | 12/2003 | Hashizume et al. | 360/97.19 |
| 6,671,124 B2 * | 12/2003 | Guion et al. | 360/97.19 |
| 6,674,600 B1 | 1/2004 | Codilian et al. | |
| 6,690,637 B1 | 2/2004 | Codilian | |
| 6,693,767 B1 | 2/2004 | Butler | |
| 6,693,773 B1 | 2/2004 | Sassine | |
| 6,697,217 B1 | 2/2004 | Codilian | |
| 6,697,218 B2 * | 2/2004 | Yoshida et al. | 360/97.19 |
| 6,698,286 B1 | 3/2004 | Little et al. | |
| 6,700,736 B1 | 3/2004 | Wu et al. | |
| 6,704,167 B1 | 3/2004 | Scura et al. | |
| 6,707,637 B1 | 3/2004 | Codilian et al. | |
| 6,707,641 B1 | 3/2004 | Oveyssi et al. | |
| 6,710,980 B1 | 3/2004 | Hauert et al. | |
| 6,710,981 B1 | 3/2004 | Oveyssi et al. | |
| 6,728,062 B1 | 4/2004 | Ou-Yang et al. | |
| 6,728,063 B1 | 4/2004 | Gustafson et al. | |
| 6,731,470 B1 | 5/2004 | Oveyssi | |
| 6,735,033 B1 | 5/2004 | Codilian et al. | |
| 6,741,428 B1 | 5/2004 | Oveyssi | |
| 6,751,051 B1 | 6/2004 | Garbarino | |
| 6,754,042 B1 | 6/2004 | Chiou et al. | |
| 6,757,132 B1 | 6/2004 | Watson et al. | |
| 6,759,784 B1 | 7/2004 | Gustafson et al. | |
| 6,765,751 B2 * | 7/2004 | Huang et al. | 360/99.14 |
| 6,765,752 B2 * | 7/2004 | Watanabe et al. | 360/99.23 |
| 6,781,780 B1 | 8/2004 | Codilian | |
| 6,781,787 B1 | 8/2004 | Codilian et al. | |
| 6,781,791 B1 | 8/2004 | Griffin et al. | |
| 6,790,066 B1 | 9/2004 | Klein | |
| 6,791,791 B1 | 9/2004 | Alfred et al. | |
| 6,791,801 B1 | 9/2004 | Oveyssi | |
| 6,795,262 B1 | 9/2004 | Codilian et al. | |
| 6,798,603 B1 | 9/2004 | Singh et al. | |
| 6,801,389 B1 | 10/2004 | Berding et al. | |
| 6,801,404 B1 | 10/2004 | Oveyssi | |
| 6,816,342 B1 | 11/2004 | Oveyssi | |
| 6,816,343 B1 | 11/2004 | Oveyssi | |
| 6,825,622 B1 | 11/2004 | Ryan et al. | |
| 6,826,009 B1 | 11/2004 | Scura et al. | |
| 6,831,810 B1 | 12/2004 | Butler et al. | |
| 6,839,199 B1 | 1/2005 | Alexander, Jr. et al. | |
| 6,844,996 B1 | 1/2005 | Berding et al. | |
| 6,847,504 B1 | 1/2005 | Bennett et al. | |
| 6,847,506 B1 | 1/2005 | Lin et al. | |
| 6,856,491 B1 | 2/2005 | Oveyssi | |
| 6,856,492 B2 | 2/2005 | Oveyssi | |
| 6,862,154 B1 | 3/2005 | Subrahmanyam et al. | |
| 6,862,156 B1 | 3/2005 | Lin et al. | |
| 6,862,176 B1 | 3/2005 | Codilian et al. | |
| 6,865,049 B1 | 3/2005 | Codilian et al. | |
| 6,865,055 B1 | 3/2005 | Ou-Yang et al. | |
| 6,867,946 B1 | 3/2005 | Berding et al. | |
| 6,867,950 B1 | 3/2005 | Lin | |
| 6,876,514 B1 | 4/2005 | Little | |
| 6,879,466 B1 | 4/2005 | Oveyssi et al. | |
| 6,888,697 B1 | 5/2005 | Oveyssi | |
| 6,888,698 B1 | 5/2005 | Berding et al. | |
| 6,891,696 B1 | 5/2005 | Ou-Yang et al. | |
| 6,898,052 B1 | 5/2005 | Oveyssi | |
| 6,900,961 B1 | 5/2005 | Butler | |
| 6,906,880 B1 | 6/2005 | Codilian | |
| 6,906,897 B1 | 6/2005 | Oveyssi | |
| 6,908,330 B2 | 6/2005 | Garrett et al. | |
| 6,922,308 B1 | 7/2005 | Butler | |
| 6,930,848 B1 | 8/2005 | Codilian et al. | |
| 6,930,857 B1 | 8/2005 | Lin et al. | |
| 6,934,126 B1 | 8/2005 | Berding et al. | |
| 6,937,444 B1 | 8/2005 | Oveyssi | |
| 6,940,698 B2 | 9/2005 | Lin et al. | |
| 6,941,642 B1 | 9/2005 | Subrahmanyam et al. | |
| 6,947,251 B1 | 9/2005 | Oveyssi et al. | |
| 6,950,275 B1 | 9/2005 | Ali et al. | |
| 6,950,284 B1 | 9/2005 | Lin | |
| 6,952,318 B1 | 10/2005 | Ngo | |
| 6,954,329 B1 | 10/2005 | Ojeda et al. | |
| 6,958,884 B1 | 10/2005 | Ojeda et al. | |
| 6,958,890 B1 | 10/2005 | Lin et al. | |
| 6,961,212 B1 | 11/2005 | Gustafson et al. | |
| 6,961,218 B1 | 11/2005 | Lin et al. | |
| 6,963,469 B1 | 11/2005 | Gustafson et al. | |
| 6,965,500 B1 | 11/2005 | Hanna et al. | |
| 6,967,800 B1 | 11/2005 | Chen et al. | |
| 6,967,804 B1 | 11/2005 | Codilian | |
| 6,970,329 B1 | 11/2005 | Oveyssi et al. | |
| 6,972,924 B1 | 12/2005 | Chen et al. | |
| 6,972,926 B1 | 12/2005 | Codilian | |
| 6,975,476 B1 | 12/2005 | Berding | |
| 6,979,931 B1 | 12/2005 | Gustafson et al. | |
| 6,980,391 B1 | 12/2005 | Haro | |
| 6,980,401 B1 | 12/2005 | Narayanan et al. | |
| 6,982,853 B1 | 1/2006 | Oveyssi et al. | |
| 6,989,953 B1 | 1/2006 | Codilian | |
| 6,990,727 B1 | 1/2006 | Butler et al. | |
| 6,996,893 B1 | 2/2006 | Ostrander et al. | |
| 7,000,309 B1 | 2/2006 | Klassen et al. | |
| 7,006,324 B1 | 2/2006 | Oveyssi et al. | |
| 7,013,731 B1 | 3/2006 | Szeremeta et al. | |
| 7,019,942 B2 * | 3/2006 | Gunderson et al. | 360/99.25 |
| 7,031,104 B1 | 4/2006 | Butt et al. | |
| 7,035,053 B1 | 4/2006 | Oveyssi et al. | |
| 7,050,270 B1 | 5/2006 | Oveyssi et al. | |
| 7,057,852 B1 | 6/2006 | Butler et al. | |
| 7,062,837 B1 | 6/2006 | Butler | |
| 7,064,921 B1 | 6/2006 | Yang et al. | |
| 7,064,922 B1 | 6/2006 | Alfred et al. | |
| 7,064,932 B1 | 6/2006 | Lin et al. | |
| 7,085,098 B1 | 8/2006 | Yang et al. | |
| 7,085,108 B1 | 8/2006 | Oveyssi et al. | |
| 7,092,216 B1 | 8/2006 | Chang et al. | |
| 7,092,251 B1 | 8/2006 | Henry | |
| 7,099,099 B1 | 8/2006 | Codilian et al. | |
| 7,113,371 B1 | 9/2006 | Hanna et al. | |
| 7,142,397 B1 | 11/2006 | Venk | |
| 7,145,753 B1 | 12/2006 | Chang et al. | |
| RE39,478 E | 1/2007 | Hatch et al. | |

(56) References Cited

U.S. PATENT DOCUMENTS

| | | |
|---|---|---|
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et al. |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,251,131 B2* | 7/2007 | Shah et al. ............... 361/679.33 |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,583 B2* | 11/2007 | Miyazaki et al. .......... 360/99.23 |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,360,982 B2* | 4/2008 | Hiraguchi et al. ............. 414/280 |
| 7,369,368 B1 | 5/2008 | Mohajerani |
| 7,372,662 B2* | 5/2008 | Xu et al. ................... 360/97.19 |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,483,238 B2* | 1/2009 | Xu et al. ................... 360/97.19 |
| 7,484,291 B1* | 2/2009 | Ostrander et al. .......... 29/603.03 |
| 7,505,231 B1 | 3/2009 | Golgolab et al. |
| 7,508,622 B2* | 3/2009 | Martin et al. .............. 360/99.13 |
| 7,529,064 B1 | 5/2009 | Huang et al. |
| 7,535,672 B2* | 5/2009 | Sega et al. ................. 360/97.15 |
| 7,538,981 B1 | 5/2009 | Pan |
| 7,561,374 B1 | 7/2009 | Codilian et al. |
| 7,561,375 B2* | 7/2009 | Kim et al. ................. 360/97.19 |
| 7,567,410 B1 | 7/2009 | Zhang et al. |
| 7,573,705 B2* | 8/2009 | Alaimo et al. ............. 361/679.37 |
| 7,576,955 B1 | 8/2009 | Yang et al. |
| 7,593,181 B1 | 9/2009 | Tsay et al. |
| 7,600,235 B2* | 10/2009 | Ide et al. ........................ 720/613 |
| 7,605,999 B1 | 10/2009 | Kung et al. |
| 7,609,486 B1 | 10/2009 | Little |
| 7,610,672 B1 | 11/2009 | Liebman |
| 7,616,400 B2* | 11/2009 | Byun et al. ................. 360/99.13 |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,660,131 B2* | 2/2010 | Drouillard et al. ............. 361/784 |
| 7,667,960 B2* | 2/2010 | Miyairi .................... 361/679.34 |
| 7,672,083 B1 | 3/2010 | Yu et al. |
| 7,684,155 B1 | 3/2010 | Huang et al. |
| 7,686,555 B1 | 3/2010 | Larson et al. |
| 7,695,316 B2* | 4/2010 | Sun .................................. 439/594 |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,778,022 B2* | 8/2010 | Bruner et al. ............. 361/679.33 |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,940,491 B2* | 5/2011 | Szeremeta et al. .......... 360/99.23 |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,007,327 B2* | 8/2011 | Yang et al. ..................... 439/862 |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,427,787 B2* | 4/2013 | McGuire, Jr. ................ 360/264.2 |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1* | 12/2013 | Lion ............................. 439/76.1 |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |

(56) References Cited

U.S. PATENT DOCUMENTS

| | | |
|---|---|---|
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,793,413 B2 * | 7/2014 | Morgan et al. .................. 710/62 |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 2001/0013989 A1 * | 8/2001 | Saiki et al. ................. 360/78.04 |
| 2002/0044416 A1 * | 4/2002 | Harmon et al. ............... 361/685 |
| 2002/0055292 A1 * | 5/2002 | Maiers et al. ................. 439/378 |
| 2002/0196580 A1 * | 12/2002 | Tsukahara et al. ......... 360/97.01 |
| 2003/0043539 A1 * | 3/2003 | Ooka ............................ 361/685 |
| 2005/0094312 A1 * | 5/2005 | Sato ........................... 360/97.01 |
| 2011/0090626 A1 * | 4/2011 | Hoellwarth et al. ..... 361/679.01 |
| 2011/0212281 A1 | 9/2011 | Jacoby et al. |
| 2012/0275105 A1 * | 11/2012 | McGuire, Jr. ............ 361/679.33 |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

* cited by examiner

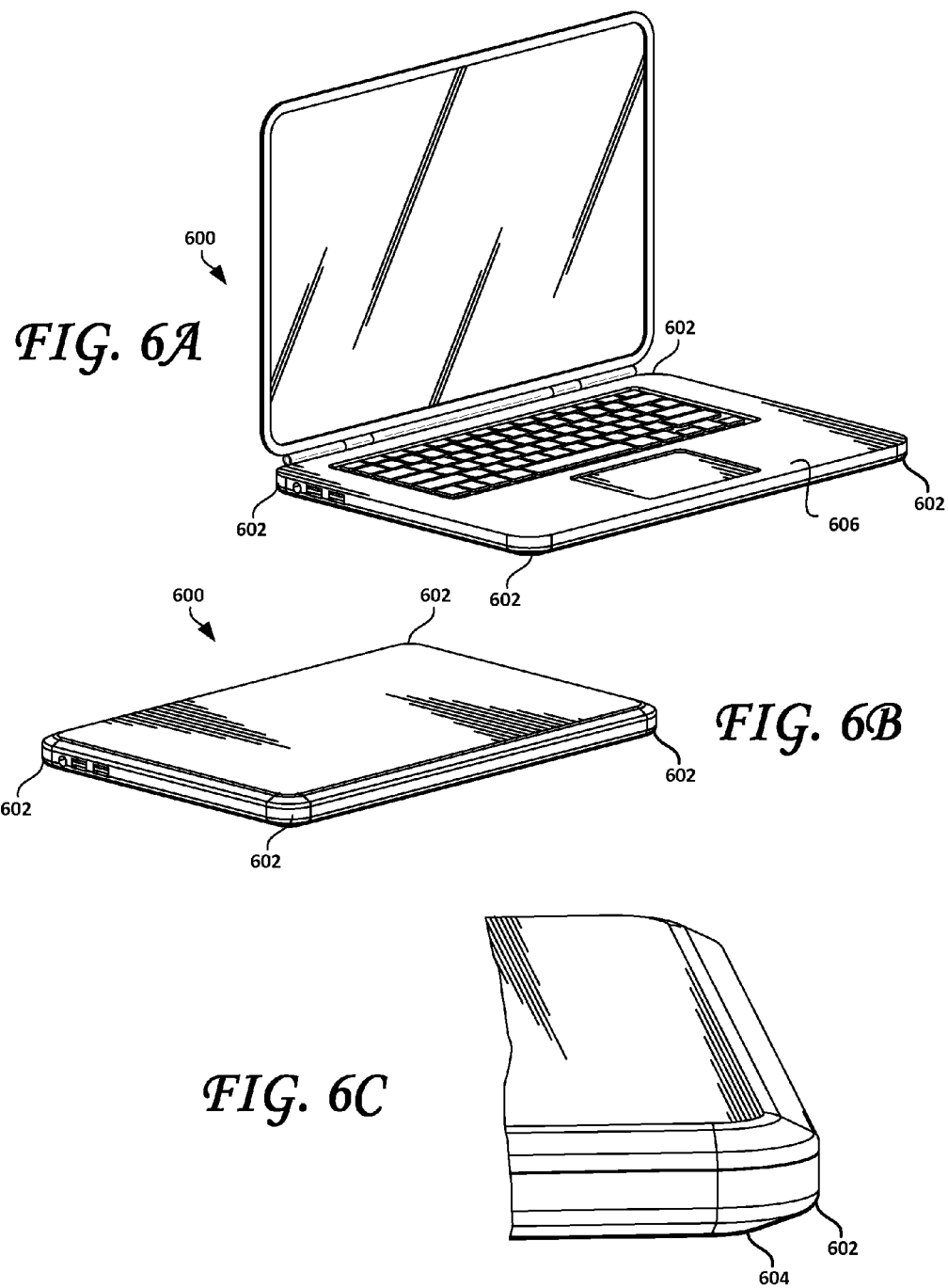

SLIM FORM FACTOR DISK DRIVE COMPRISING DISK DRIVE ENCLOSURE HAVING AN INSULAR RAISED REGION

BACKGROUND

Each subsequent generation of mobile computing devices, such as notebooks and tablets, is smaller and thinner than the preceding one. Typical notebooks computers were fully 25 mm thick and contained the long-standard 9.5 mm tall 2.5" hard disk drive (HDD). Newer notebooks are only 18 mm thick and use a 7 mm tall HDD. Some notebooks are thinner yet, and use solid-state memory, which can be less than 2 mm tall. Thin notebooks with HDDs conventionally route all other componentry around the relatively tall HDD, such that the bottom structure of the chassis, the palmrest structure and sway space for the HDD are the only features above and below the HDD.

A 7 mm 2.5" HDD is conventionally integrated with a mating Serial Advanced Technology Attachment (SATA) connector and cable that runs to the laptop's motherboard. These add to the overall integrated length of the HDD. The chassis bottom and palmrest must be held together (typically with screw bosses) at the periphery of the HDD, but outside of the HDD's rectangular form factor. These structures also add to the integrated length and width of the HDD. Many notebooks feature chassis bottoms that curve up from a flat underside to the front edge and/or sides of the notebook. Many notebook chassis also radius the left and right front corners. With the rectangular block geometry of the 7 mm 2.5" form factor, the HDD must be set-back from the notebook edges (front, side and bottom) and from the front corners to accommodate these curved features. These set-backs also increase the integrated length, width and height of the HDD.

BRIEF DESCRIPTION OF THE DRAWINGS

FIG. 6A shows a first view of a laptop computer for which a disk drive according to one embodiment is configured.

FIG. 6B shows a second view of a laptop computer for which a disk drive according to one embodiment is configured.

FIG. 6C shows a detail of a laptop computer for which a disk drive according to one embodiment is configured.

DETAILED DESCRIPTION

Figure 1:
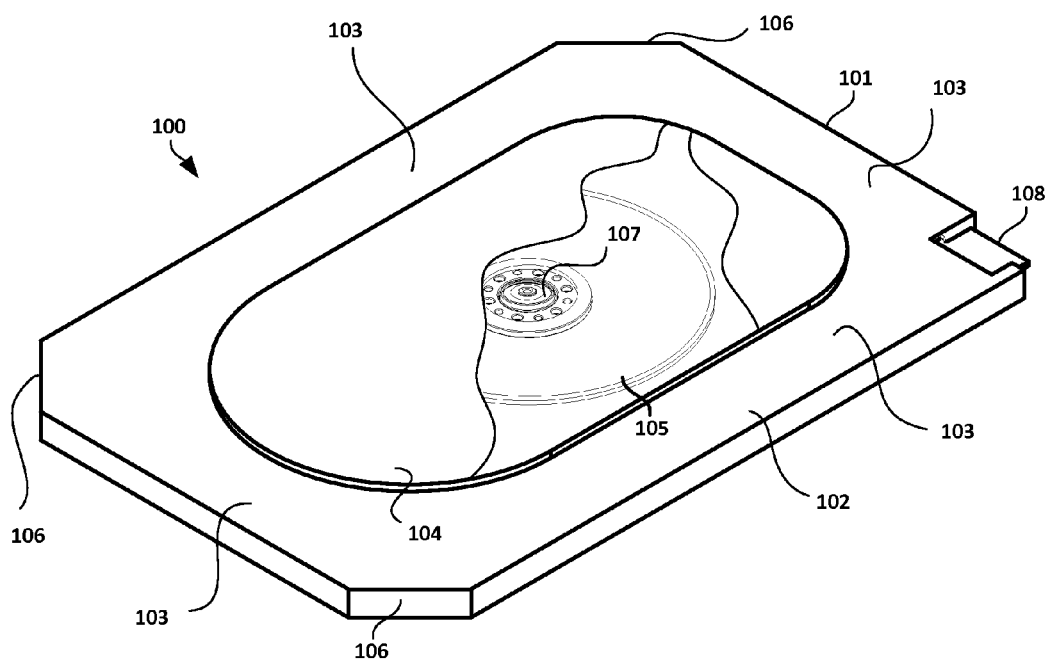
FIG. 1 shows a perspective view of a disk drive according to one embodiment.
Figure 2:
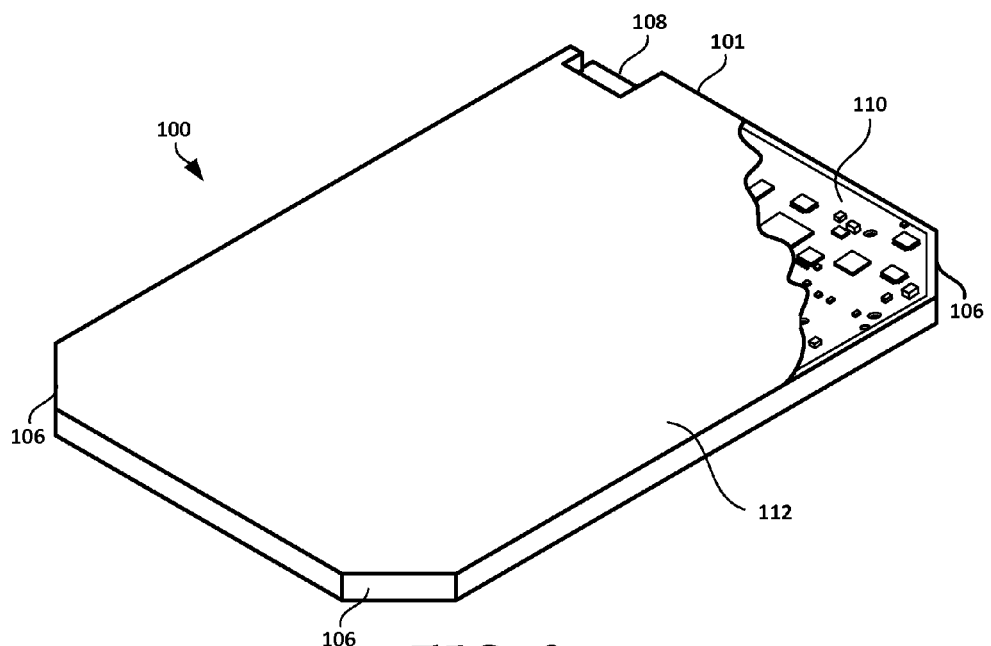
FIG. 2 shows another perspective view of a disk drive according to one embodiment.

FIG. 1 shows a perspective view of a disk drive 100 according to one embodiment. FIG. 2 shows another perspective view of a disk drive according to one embodiment. Considering now FIGS. 1 and 2 collectively, the disk drive 100 comprises a drive enclosure 101 defining a generally rectangular form factor. That is, the general shape of the drive enclosure 101 is rectangular. The disk drive 100 may comprise an electromechanical assembly contained within the drive enclosure 101. The electromechanical assembly may comprise, as shown in FIGS. 1 and 2, a disk 105 coupled to a spindle motor 107. The disk drive 100 may also comprise an actuator assembly (not shown), as well as other various components, as those of skill in this art will recognize. In FIG. 1, the spindle motor 107 and a portion of the disk(s) 105 are shown in a cutaway view, as is the PCBA 110 in FIG. 2.

Figure 3:
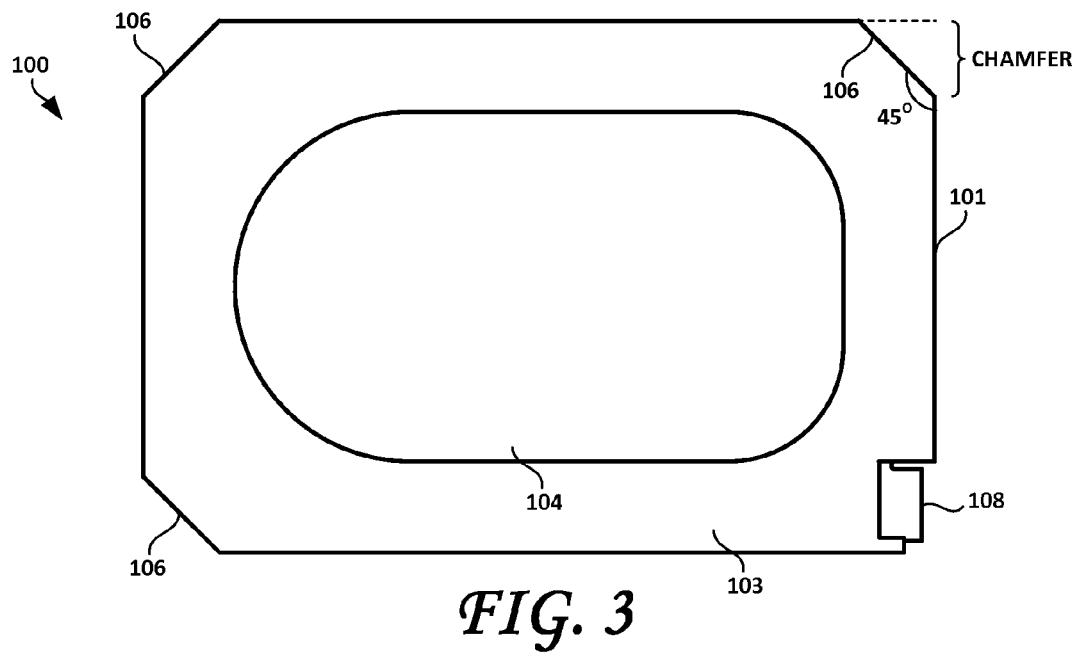
FIG. 3 shows a plan view of a disk drive according to one embodiment.
Figure 4:
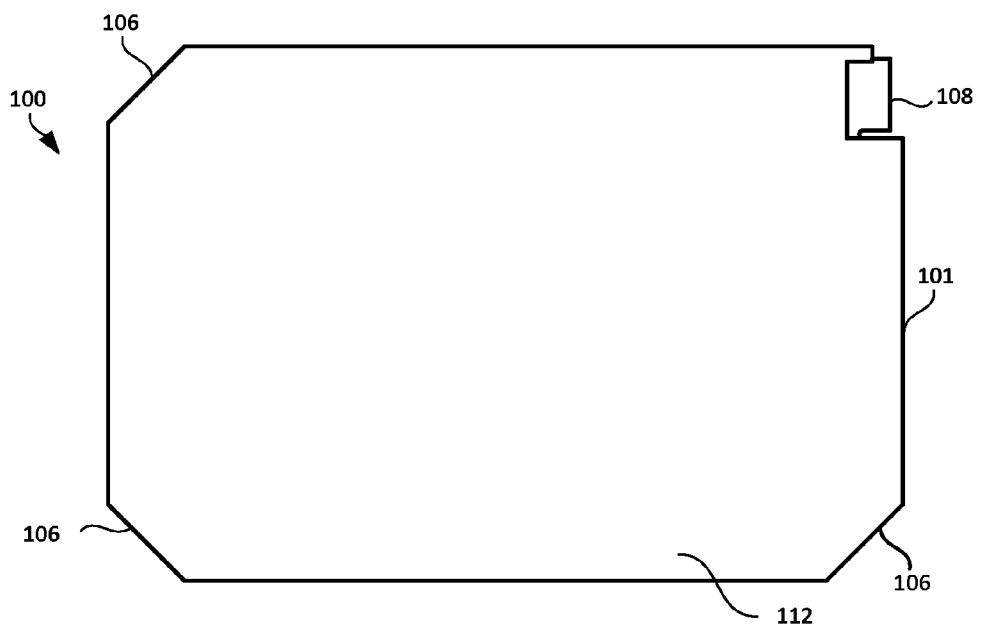
FIG. 4 shows another plan view of a disk drive according to one embodiment.

FIG. 3 shows a plan view of a disk drive according to one embodiment. As shown therein, the drive enclosure 101 defines chamfers 106 on at least one of four corners of the drive enclosure 101. The chamfers 106 may be configured such that they are or occupy at least 5% of the width of the drive enclosure 101. For example, the chamfers 106 may be configured such that they are or occupy at least 10% of the width of the generally rectangular for factor of the disk drive enclosure 101. As shown at 108 and according to one embodiment, a connector 108, coupled to the PCBA 110, may disposed at or near the fourth corner; that is, the corner of the drive enclosure 101 that is not chamfered. As shown in FIG. 3 and according to one embodiment, the chamfers 106 may be defined so as to form a 45 degree angle with the sides of the drive enclosure 101. However, the drive enclosure 101 may be shaped or otherwise formed or fabricated with other chamfer angles. According to one embodiment, the drive enclosure 101 may comprise fewer than three chamfers and all of the chamfers need not form the same angles with respect to the sides of the drive enclosure 101.

Collective reference is now made to FIGS. 1-5. As shown, a disk drive 100 may comprise a drive enclosure 101 defining a generally rectangular form factor. An electromechanical assembly may be contained within the drive enclosure 101. The electromechanical assembly may comprise a head disk assembly (HDA), of which a spindle motor 107 and a disk 105 are visible in the cutaway view of FIG. 1. The disk drive 100 may also comprise, as shown in the cutaway view of FIG. 2 a printed circuit board assembly (PCBA) 110, at least partially contained within the drive enclosure 101. According to one embodiment, the PCBA 110 may be disposed at or near one end of the disk drive 100. The disk drive 100 may be configured, according to one embodiment, such that the PCBA 110, being disposed at or near the end of the disk drive 100, is not disposed over the HDA or such that only a portion of the PCBA 110 is disposed over the HDA. Indeed, the PCBA 110 may be configured to be of a size and shape such that, when the PCBA 110 is disposed at or near one of the ends of the disk drive 100, it does not overlap the electromechanical assembly or portions thereof, thereby further contributing to the slim form factor of the disk drive 100.

As shown in FIGS. 1-5, the drive enclosure 101 of the disk drive 100 comprises a bottom surface 112 and a top surface 102. As utilized herein, the terms "top" and "bottom" are not intended to convey any orientation information, but only to distinguish one surface from another surface. The top surface 102 may comprise or define an interior top surface portion 104 and a peripheral top surface portion 103 at least partially surrounding the interior top surface portion 104. According to one embodiment, the interior top surface portion 104 and the peripheral top surface portion 103 define an elevation differential. For example, the interior top surface portion 104 may be raised relative to the peripheral top surface portion 103. In this manner, the interior top surface portion 104 forms an insular raised region at least partially surrounded by the peripheral top surface portion 103. Indeed, according to one embodiment, the interior top surface portion 104 is further away from the bottom surface 112 than is the peripheral top surface portion 103 by about, for example, 0.25 mm to about 2 mm. According to one embodiment, the interior top surface portion 104 is further away from the bottom surface 112 than is the peripheral top surface portion 103 by about, for example, 0.75 mm to about 1.25 mm. For example, the interior top surface portion 104 may be further away from the bottom surface 112 than is the peripheral top surface portion 103 by about 1 mm.

Figure 5A:
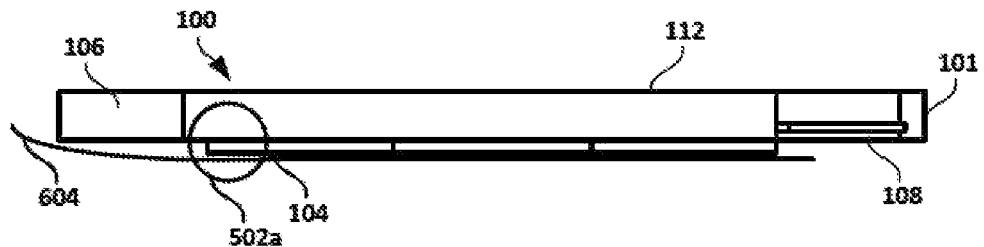
FIG. 5A shows a side view of a disk drive according to one embodiment.
Figure 5B:
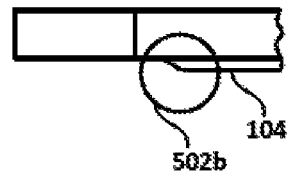
FIG. 5B shows a detail of FIG. 5A, according to one embodiment.

According to one embodiment, the interior top surface portion 104 of the drive enclosure 101 may be generally disposed over at least a portion of the electromechanical assembly. As shown in FIGS. 1 and 2, the interior top surface portion 104 may be configured such that it overlays the spindle motor 107 and at least a portion of the disk or disks 105 and/or at least a portion of the PCBA 110. As shown in FIG. 1, FIG. 5A and FIG. 5B, according to one embodiment, the transition between the interior top surface portion 104 and the peripheral top surface portion 103 may be a step, as shown at 502a in FIG. 5. According to one embodiment shown in FIG. 5C, the transition between the interior top surface portion 104 and the peripheral top surface portion 103 may be a taper defining a more gradual transition, such as an inclined plane or a tapered surface joining the two surfaces 103, 104, as shown at detail 502b. According to one embodiment, the taper may extend to or near the edge of the disk drive 100, as shown at 502c.

Figure 7:
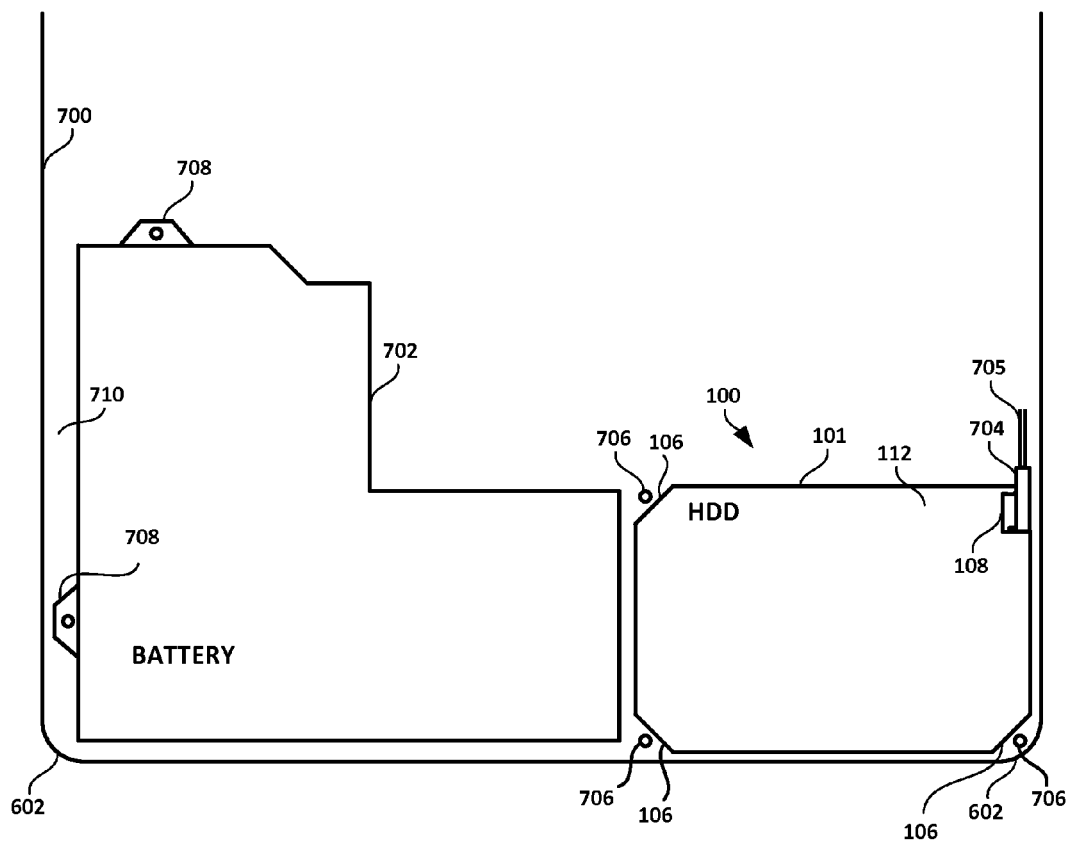
FIG. 7 shows a plan view of the layout of a disk drive within a mobile computing device such as a laptop computer, according to one embodiment.

One embodiment shown in FIGS. 1-5 is a disk drive, comprising a drive enclosure 101 defining a generally rectangular form factor and an electromechanical assembly contained within the drive enclosure 101. As noted above, the electromechanical assembly may comprise a PCBA 110 at least partially contained within the drive enclosure 101. According to one embodiment, a recessed connector 108 may be coupled to the PCBA 110. The recessed connector 108 may be configured such that a mating connector coupled thereto does not extend beyond the generally rectangular form factor of the drive enclosure 101. That the recessed connector 108 coupled to the PCBA 110 does not extend beyond the rectangular form factor of the drive enclosure 101 (that is, beyond the footprint of the drive enclosure 101) is best shown in FIG. 7, in which the connector 704 mated to the recessed connector 108 does not extend beyond the generally rectangular form factor of the drive. The small size, recessed nature and placement of the connector 108 enable a mating connector 704 to extend no further than the footprint of the drive enclosure 101, thereby enabling the disk drive 100 to be disposed, for example, in close proximity or intimate contact with a facing surface. As shown in FIGS. 1-5, the recessed connector 108 may be disposed at a non-chamfered corner of the drive enclosure. Alternatively, the recessed connector 108 may be disposed along a chamfered corner at an angle or along one of the sides of the drive enclosure 101, including in a configuration not shown in the figures such as along a longer side of the drive. According to one embodiment, the recessed connector 108 may be a SATA compatible connector. In other embodiments, the recessed connector 108 may be of another type such as SAS, PCIe, USB, etc.

Portable electronic devices may be configured for a disk drive according to one embodiment. One example of such a portable electronic device is a laptop computer 600, as shown in FIGS. 6A, 6B and 6C. As shown therein, the laptop computer 600 may feature rounded corners 602 on the laptop's chassis. Moreover, as shown at FIG. 6C, the base of the chassis that supports the laptop may also comprise a rounded or curved surface 604 that extends from the base surface of the laptop computer 600 up to the sides thereof. The laptop computer 600 therefore, may comprise both rounded corners 602 and a curved base surface 604. A disk drive 100 according to one embodiment is particularly well suited to make the most efficient use of the spatial constraints imposed by such structures.

Figure 5C:
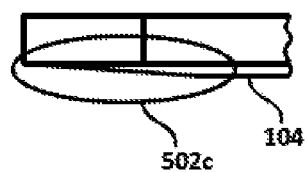
FIG. 5C shows an alternate embodiment of the detail shown in FIG. 5B.

FIG. 7 shows a plan view of the layout of a disk drive within a mobile computing device such as a laptop computer, according to one embodiment. The plan view of FIG. 7 shows the general layout of a disk drive according to one embodiment within the laptop computer's chassis, which is disposed generally within the vicinity of the laptop's palmrest area 606, shown in FIG. 6A. As shown in FIG. 7, the chassis 700 defines rounded corners 602. Such rounded corners 602 decrease the space available for internal components, such as the battery 702. Because of such rounded corners 602, the battery 702 cannot be disposed as close to the corners as would be possible had such corners been square. Moreover, the battery 702 may comprise attachment tabs 708 that protrude from the body thereof, which attachment tabs 708 increase the footprint of the battery 702. This increased footprint creates dead space 710 that is not easily utilized for any useful purpose. One embodiment of a disk drive 100 may also be disposed within the chassis 700. To best accommodate both the rounded corners 602 and the curved base surface 604 (best shown in FIG. 6C) of the chassis of the mobile computing device, the disk drive 100 may be disposed within the chassis such that the bottom surface 112 faces the palmrest 606 and the interior top surface portion 104 and the peripheral top surface portion 103 of the drive enclosure 101 face the base of the chassis of the laptop (as shown in FIG. 7). In this manner, as the disk drive 100 may be thinner (e.g., 4 mm or less) along its outside periphery (along the peripheral top surface portion 103) and thickest (e.g., 5 mm or less) only at or near the center of the drive enclosure (at the interior top surface portion 104). The thinner portion of the disk drive 100, along the peripheral top surface portion 103, may be disposed over the curved base surface 604. This (e.g., 1 mm) extra space along the periphery of the drive enclosure 101 allows the disk drive 100 to be placed closer to the curved base surface 604 of the chassis than it otherwise could be without this extra space along the periphery, as shown in FIGS. 5A, 5B and 5C. Indeed, as shown in FIGS. 5A, 5B and 5C, the relatively thinner profile of the drive enclosure 101 around the peripheral top surface portion 103 enables the drive enclosure 101 to be disposed within the curve of the curved base surface 604. Also, by disposing the peripheral top surface portion 103 close to the curved base surface 604, the interior top surface portion 104 of the drive enclosure 101 may be disposed over the flat portion of the bottom of the chassis. Accordingly, the drive enclosure 101 of a disk drive according to one embodiment may significantly reduce or eliminate the need to setback the disk drive from the curved base surface 604, thereby making the most efficient use of available space.

The embodiment of the disk drive 100 shown in FIG. 7 defines three chamfers, one of which is disposed in closer proximity to a rounded corner 602 than would have been possible had the drive enclosure 101 not defined such chamfers. Moreover, as shown in FIG. 7, the chamfers 106 allow for the placement of other structural elements or components of the mobile computing device (such as a laptop computer, for example) within the space freed up by the chamfer(s) of the drive enclosure 101. According to one embodiment, such structural elements 706 may comprise, for example, screw bosses. By virtue of the space freed up by the chamfers and the placement of such structural elements in close proximity to the chamfers, the structural elements 706 fit within the generally rectangular form factor of the disk drive enclosure 101. In this manner, such structural elements 706 disposed adjacent the chamfers need not extend, subject to size limitations, beyond the form factor of the drive enclosure 101.

According to one embodiment, the disk drive 100 may also comprise the recessed connector 108, which is configured such that mating connector 704 does not extend beyond the form factor of the drive enclosure 101. It is understood that the cabling 705 extends beyond the form factor of the drive enclosure 101, to enable it to couple to other structures, such as to a motherboard. That is, even when the mating connector 704 and its associated cabling 705 is coupled to the recessed connector 108, the integrated length of the resulting disk drive with mating connector 704 assembly need not exceed the length of the disk drive 100 alone, thereby enabling significant savings in space within the chassis of the mobile computing device. However, the cabling 705 may extend in any direction.

By combining at least some of the structural features described and shown herein into a disk drive, significant space savings within mobile computing devices may be realized. However, it is to be understood that advantages may be realized through inclusion of any single one of the structural features or characteristics described herein in a disk drive. Indeed, one embodiment is a disk drive 100 comprising a drive enclosure defining one or more chamfers 106 at the corners thereof and/or a mobile computing device comprising the same. One embodiment is a disk drive 100 comprising an interior top portion surface 104 defining a thicker region at or near the center of the drive enclosure 101 and a peripheral top surface portion 103 defining a relatively thinner region toward the periphery of the drive enclosure 101 and/or a mobile computing device comprising the same. Also, one embodiment is a disk drive 100 comprising a recessed connector 108 that is configured to mate with a mating connector 704 such that the mating connector 704 does not extend beyond the form factor of the drive enclosure 101 and/or a mobile computing device comprising the same. Each of these structural features may be present in a disk drive and/or a mobile computing device comprising the same alone or in combination with another structural feature or features.

While certain embodiments of the inventions have been described, these embodiments have been presented by way of example only, and are not intended to limit the scope of the inventions. Indeed, the novel disk drives and mobile computing devices comprising such described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structures (such as, for example, the chamfers, the recessed connector and/or the interior top portion surface 104 and the peripheral top surface portion 103) may differ from those shown in the figures. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A data storage device, comprising:
   storage media;
   a printed circuit board assembly (PCBA);
   an enclosure defining a generally rectangular form factor, the enclosure being configured to enclose the storage media and at least partially enclose the PCBA, such that an interior surface of the enclosure directly overlays the storage media and at least part of the PCBA without an intervening enclosure surface therebetween, and
   a recessed connector coupled to the PCBA, the recessed connector being configured to mate with a mating connector having a cable attached thereto, the recessed connector being recessed within the enclosure such that the mating connector, when mated to the recessed connector, extends no further than a length of the data storage device.

2. The data storage device of claim 1, wherein the recessed connector is further configured such that the mating connector, when mated to the recessed connector, extends no further than the generally rectangular form factor of the enclosure, exclusive of the cable.

3. The data storage device of claim 1, wherein the recessed connector is disposed at or near a corner of the PCBA and a corresponding corner of the enclosure.

4. The data storage device of claim 3, wherein at least one corner of the enclosure is chamfered.

5. The data storage device of claim 1, wherein at least one corner of the enclosure is chamfered and wherein the recessed connector is disposed at or near the chamfered corner.

6. The data storage device of claim 1, wherein the recessed connector is disposed along a side of the enclosure.

7. The data storage device of claim 1, wherein the recessed connector is configured to accommodate the mating connector such that the cable at least initially extends from the mating connector in a direction that is generally perpendicular to a length direction of the enclosure.

8. The data storage device of claim 1, wherein a length of the data storage device, measured at the recessed connector, is less than a length of the data storage device measured away from the recessed connector.

9. The data storage device of claim 1, wherein a portion of the enclosure, adjacent to the recessed connector, is configured to accommodate the cable of the mating connector such that the cable extends no further than a length of the data storage device.

10. The data storage device of claim 1, wherein when the mating connector is attached to the recessed connector, an integrated length of the data storage device and the attached mating connector is no greater than a length of the data storage device alone, without the attached mating connector.

11. An enclosure for a data storage device, the enclosure being configured to enclose storage media and at least partially enclose a printed circuit board assembly (PCBA), the enclosure defining a generally rectangular form factor and being configured to enclose the storage media and at least partially enclose the PCBA such that an interior surface of the enclosure directly overlays the storage media and at least part of the PCBA without an intervening enclosure surface therebetween, the enclosure being further configured to accommodate a recessed connector coupled to the PCBA, the recessed connector being configured to mate with a mating connector having a cable attached thereto, the enclosure being configured to enable the recessed connector to be recessed within the enclosure such that the mating connector, when mated to the recessed connector, extends no further than a length of the data storage device.

12. The enclosure of claim 11, wherein the recessed connector is further configured such that that the mating connector, when mated to the recessed connector, extends no further than the generally rectangular form factor of the enclosure, exclusive of the cable.

13. The enclosure of claim 11, wherein the enclosure is configured to accommodate the recessed connector disposed at or near a corner of the PCBA.

14. The enclosure of claim 13, wherein at least one other corner of the enclosure is chamfered.

15. The enclosure of claim 11, wherein at least one corner of the enclosure is chamfered and wherein the recessed connector is disposed at or near the chamfered corner.

16. The enclosure of claim 11, wherein the enclosure is further configured to accommodate the recessed connector along a side of the enclosure.

17. The enclosure of claim 11, wherein the enclosure is further configured to accommodate the mating connector such that the cable at least initially extends from the mating connector in a direction that is generally perpendicular to a length direction of the enclosure.

18. The enclosure of claim 11, wherein a length of the enclosure, measured at where the enclosure accommodates the recessed connector, is less than a length of the enclosure measured away from where the enclosure accommodates the recessed connector.

19. The enclosure of claim 11, wherein a portion of the enclosure, adjacent to where the enclosure accommodates the recessed connector, is configured to accommodate the cable of the mating connector such that the cable extends no further than a length of the data storage device.

20. The enclosure of claim 11, wherein in use, when the mating connector is attached to the recessed connector, an integrated length of the enclosure and the attached mating connector is no greater than a length of the enclosure alone, without the attached mating connector.

* * * * *